United States Patent [19]
Wacker et al.

[11] Patent Number: 5,938,079
[45] Date of Patent: *Aug. 17, 1999

[54] DISPENSING HEAD FOR TWO-COMPONENT FOAM WITH SHUTOFF

[75] Inventors: Robert L. Wacker, Wellington; William R. Hoversten, Stow; Gerald Peters, Elyria; Dan Reep, Amherst, all of Ohio

[73] Assignee: Nordson Corporation, Westlake, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/578,066

[22] Filed: Dec. 20, 1995

Related U.S. Application Data

[63] Continuation-in-part of application No. 08/379,976, Jan. 27, 1995, abandoned.

[51] Int. Cl.⁶ .................................................. B67D 5/37
[52] U.S. Cl. ...................... 222/108; 222/214; 222/145.6; 222/504
[58] Field of Search ............................ 222/145.1, 145.2, 222/145.5, 145.6, 145.7, 504, 108, 109, 214; 366/318, 322

[56] References Cited

U.S. PATENT DOCUMENTS

| | | |
|---|---|---|
| 3,035,775 | 5/1962 | Edwards et al. . |
| 3,067,987 | 12/1962 | Ballou et al. . |
| 3,097,671 | 7/1963 | Bonetti et al. . |
| 3,222,134 | 12/1965 | Peterson . |
| 3,239,100 | 3/1966 | Peterson ..................................... 222/57 |
| 3,362,919 | 1/1968 | Rood ...................................... 366/322 |
| 3,471,131 | 10/1969 | Fritzweiler et al. ..................... 366/318 |
| 3,482,822 | 12/1969 | Krizak . |
| 3,684,250 | 8/1972 | Roeser . |
| 3,830,407 | 8/1974 | Wierlo ................................... 222/145.6 |
| 3,876,145 | 4/1975 | Gusmer et al. . |
| 3,949,904 | 4/1976 | Hendrickson . |
| 4,030,640 | 6/1977 | Citrin et al. ......................... 222/214 X |
| 4,095,722 | 6/1978 | Miller .................................. 222/108 X |
| 4,350,803 | 9/1982 | Penn . |
| 4,471,887 | 9/1984 | Decker . |
| 4,523,696 | 6/1985 | Commette et al. . |
| 4,634,027 | 1/1987 | Kanarvogel . |
| 4,648,421 | 3/1987 | Chant et al. . |
| 4,717,047 | 1/1988 | Van Overbruggen et al. ..... 222/214 X |

(List continued on next page.)

FOREIGN PATENT DOCUMENTS

| | | |
|---|---|---|
| 2085834 | 12/1971 | France . |
| 2250619 | 6/1975 | France . |
| 2283733 | 4/1976 | France . |
| 2604146 | 3/1988 | France ................................... 222/214 |
| 2513662 | 10/1976 | Germany . |
| 3502763 | 8/1985 | Germany . |
| 1073571 | 6/1967 | United Kingdom . |
| 1483225 | 8/1977 | United Kingdom ................... 222/214 |
| 93/18849 | 9/1993 | WIPO . |

OTHER PUBLICATIONS

Western Electric Technical Digest No. 62, Drip–Free Dispensing of Viscous Liquids, Apr. 1981.

*Primary Examiner*—Kenneth Bomberg
*Attorney, Agent, or Firm*—Rankin, Hill, Porter & Clark LLP

[57] ABSTRACT

A mixing and dispensing head is designed for use in a two component foam system. The head includes a body having a mixing chamber formed therein along a longitudinal axis and having a dispensing channel downstream of the mixing chamber. At least two supply portions are connected to the body, with each of the supply portions for supplying one of the components to the mixing chamber at a component entry location. Each of the component entry locations is longitudinally offset from each other. A rotating mixing member within the mixing chamber for mixing the components together to form the foam product. The mixing member includes a cylindrical core having indentations in the core and having angled vanes extending from the core. A shutoff portion is provided for stopping the flow of product from the dispensing channel.

7 Claims, 10 Drawing Sheets

U.S. PATENT DOCUMENTS

| | | |
|---|---|---|
| 4,726,933 | 2/1988 | Mayr et al. . |
| 4,767,025 | 8/1988 | Gebauer et al. . |
| 4,834,545 | 5/1989 | Inoue et al. . |
| 4,881,821 | 11/1989 | Stutz . |
| 4,951,843 | 8/1990 | Paetow . |
| 4,967,940 | 11/1990 | Blette et al. ................... 222/109 X |
| 5,004,125 | 4/1991 | Standlick . |
| 5,072,862 | 12/1991 | Keller . |
| 5,104,006 | 4/1992 | Brown . |
| 5,180,082 | 1/1993 | Cherfane . |
| 5,195,665 | 3/1993 | Lina . |
| 5,230,253 | 7/1993 | Blough, Jr. et al. . |
| 5,249,862 | 10/1993 | Harold et al. . |
| 5,332,125 | 7/1994 | Schmitkons et al. ............. 222/145.6 |

DISPENSING HEAD FOR TWO-COMPONENT FOAM WITH SHUTOFF

CROSS REFERENCE TO RELATED APPLICATION

This application is a continuation in part of Application Ser. No. 08/379,976, filed Jan. 27, 1995, now abandoned.

BACKGROUND OF THE INVENTION

1. Field of the Invention

This invention relates to foam materials produced from a chemical reaction by mixing two liquid components, and in particular to a system for dispensing the foam material and applying the foam material to a substrate.

2. Description of the Prior Art

Two component foaming systems are used in a wide variety of applications to create a closed-cell foam product and to apply the foam product to a substrate. Foam products produced in this manner can be used as sealants which provide barriers against air, dust, vapor and fluids in various applications. They also find application in providing thermal or sound insulation layers.

In two component foam dispensing systems, the foam is created by a chemical reaction between the two liquid components. When the two liquid components are mixed together, the chemical reaction occurs, creating a new compound, such as polyurethane, which is the foamed material, and creating a foaming agent, such as carbon dioxide, which is entrained within with the foamed material to create the foam. Since the chemical reaction occurs almost instantaneously, the two liquid components must be mixed together in a dispensing head immediately prior to applying the foam material onto the substrate.

In order to properly and effectively create and apply two component foam products, several factors must be considered. One consideration is the proper ratio of liquid components. In order to create the foam product with the desired physical properties and appearance, the mass quantities of each of the components must be properly matched. This requires that the flow rate of each of the liquid components that is supplied to the mixing and dispensing head be accurately controlled. Since the mass flow of each component will vary depending upon several factors, such as the amount of entrained air in the liquid and the temperature of the liquid, it is sometimes difficult to accurately meter the flow of the components to the dispensing head.

Another consideration is the separate maintenance of each of the components prior to dispensing and the proper mixing of the components in the dispensing head. Since the components when mixed will almost instantly react to produce the foamed product, it is important that the components remain separate and that mixing of the components is avoided until immediately prior to dispensing the foam onto a substrate. For this purpose, a dispensing head or gun must be used in which the two components can be mixed and in which the mixture is then immediately applied to the substrate.

The mixing and dispensing heads used with such systems can be either dynamic mixers or static mixers. Dynamic mixers using a mixing element, such as a rotating mixing core to create a turbulence in a mixing chamber which contains both components. The components are thus mixed together, and the chemical reaction which creates the foam product occurs. Static mixers accomplish the mixing of the components without a moving element. An example of static mixer is an impingement mixer in which the mixing of the two liquid components is accomplished by forcing each component through a jet or nozzle and shooting each component against each other to mix the components together.

Another consideration is the maintenance of the dispensing head or gun in a clean condition. After the liquid components have been mixed together in the head, the foam product is created, and this foam product can build up along the dispensing flow path inside the gun. This build-up of foam material must be cleaned from the gun periodically, and for this purpose a purge system is usually provided. The purge system is used to provide a supply of an appropriate cleaning solvent to the dispensing flow path of the gun to clean the flow path.

Another consideration is the ability of the system to accommodate intermittent operation of the dispensing head or gun. In most dispensing systems, the foam product is not dispensed continually onto the substrate. Instead, the dispensing flow is turned on and off, and this intermittent operation of the dispensing head must be accommodated. When the dispensing flow is turned on and off, there can be intermittent increases in pressure of the lines supplying the liquid components to the dispensing head. These pressure increases can affect the flow rate of the components, and, if the mass flow rate of one component varies relative to the other component, the components will not be mixed in the proper proportion, causing an adverse effect to the properties and appearance of the foam product being dispensed.

One problem associated with the mixing and dispensing heads is the residual dripping of the foam product from the dispensing head after the flow of foam material should be cut off. The flow of foam material in the mixing and dispensing head is usually regulated by valves which control the supply of the liquid components to the head. When it is desired to interrupt the dispensing of the foamed material, the component supply valves are closed. The remaining amounts of liquid components mix together to create the foamed product, which then exits from the mixing chamber and from the dispensing head, but there is usually no positive shut off of the foamed material from the dispensing head. As a result, small remaining amounts of the foam product can continue to drip from the dispensing head after the flow of the components has been cut off. This drip can fall onto portions of the substrate at undesired locations and can otherwise provide a nuisance during production.

SUMMARY OF THE INVENTION

The present invention provides a dynamic mixing and dispensing head for use in a two-component foam dispensing system, which overcomes the problems of the prior art and provides several unique advantages. The present invention relates to a dynamic mixer in which a moving mixing element is used to create turbulence to positively mix the two components together. This dynamic mixer should be contrasted with the static mixers which do not use such a mixing element.

The present invention provides a unique design for a mixing and dispensing head which contains a dynamic mixing chamber and in which the two liquid components are supplied to the mixing chamber at different vertical locations. The component supplies are vertically offset from each other, so that one of the components enters the mixing chamber upstream of the other component. This allows the components to more easily mix together. Where one of the components has better lubricating qualities than the other and has less tendency to attack the seals, the vertically offset component supplies allow the better lubricating component to be introduced into the mixing chamber first.

The dynamic mixing and dispensing head of the present invention uses a mixing core which rotates in a mixing chamber. The mixing core has an effective arrangement of indentations and angled vanes on its exterior which creates turbulence within the mixing chamber to thoroughly mix the components together. This thorough mixing of the components assures that the chemical reaction which creates the foam will be complete and that the presence of unreacted components is avoided.

To prevent the undesired dribble or drip of residual foam product, the mixing and dispensing head of this invention also includes a flow shutoff assembly located at the extreme downstream end of the head where the foamed material exits the head. The flow shutoff assembly provides for a positive shut off of the foamed material from the mixing and dispensing head, so that the residual material does not drip onto the substrate after the component supply valves have been closed. The flow shutoff assembly operates automatically, so that manual pinching or closing of the dispensing channel is avoided. Preferably, the flow shutoff assembly includes a withdrawal or sucking operation which pulls any residual material below the shutoff back up the dispensing channel to eliminate drips or dribbles. The flow shutoff assembly is preferably pneumatically actuated to facilitate the closing of the dispensing channel as desired.

These and other advantages are provided by the present invention of a mixing and dispensing head for a two component foam system. The head comprises a body having a mixing chamber formed therein along a longitudinal axis; at least two supply portions connected to the body, each of the supply portions for supplying one of the components to the mixing chamber at a component entry location, each of the component entry locations being longitudinally offset from each other; and a rotating mixing member within the mixing chamber for mixing the components together to form the foam product.

In accordance with another aspect of the present invention, a dispensing head is provided for a fluid material. The dispensing head comprises a dispensing channel providing a supply of fluid material to be dispensed. A housing is connected to the dispensing channel, the housing having an inner chamber. A flexible tube is positioned within the housing and communicates with the dispensing channel to receive a flow of the material, the tube extending through the chamber. A port provides a supply of pressurized fluid to the chamber at variable pressure, a low pressure of fluid allowing the flow of material through the tube, a high pressure of fluid producing substantial pinching of the tube, and an intermediate pressure producing less pinching of the tube and causing withdrawal of the material in the tube in an upstream direction below the pinching.

DETAILED DESCRIPTION OF THE PREFERRED EMBODIMENT

Figure 1:
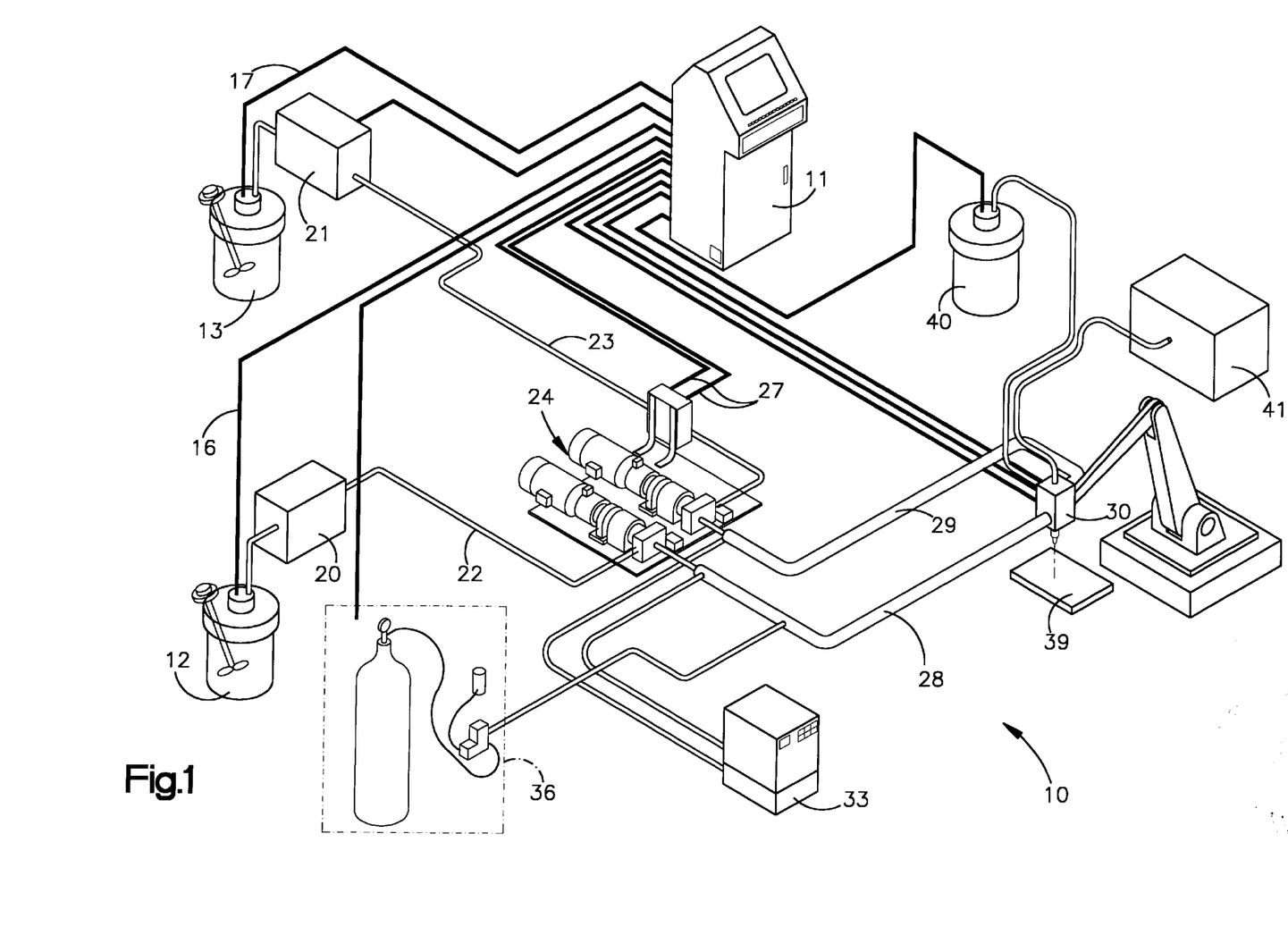
FIG. 1 is a schematic diagram of the two-component foam dispensing system.

Referring more particularly to the drawings and initially to FIG. 1, there is shown a two-component foam dispensing system 10. The system 10 is described more fully in co-pending patent application, entitled "Method and Apparatus for Dispensing Two-Component Foam," Application Ser. No. 08/379,720, filed on Jan. 27, 1995. The system 10 comprises a control console 11 which contains all of the control circuits for operating the system. The system 10 also comprises two supply tanks 12 and 13, each providing a reservoir containing one of components which will be combined to form the foamed material. A first component is contained in the supply tank 12 and a second component is contained in the other supply tank 13. In this embodiment disclosed herein, the system 10 disclosed is a two-component foam system comprising polyol and isocyanate which combine to form polyurethane foam. Thus, in this embodiment, the first component contained in the supply tank 12 is polyol, and the second component contained in the supply tank 13 is isocyanate. It should be understood, however, that the system 10 can be used with other two-component foam combinations. Each of the supply tanks 12 and 13 may contain suitable level controls to monitor the amount of material in each tank, and each of the supply tanks is connected to the control console 11 by control lines 16 and 17.

Preferably, high pressure pumps 20 and 21 are used to feed the components from the supply tanks 12 and 13 through suitable supply hoses 22 and 23 to metering pumps 24. The metering pumps 24 may be essentially the same as those shown in U.S. Pat. No. 5,332,125, the disclosure of which is hereby incorporated by reference in its entirety. The metering pumps 24 accurately meter the proper mass ratio of each of the two components from the supply tanks 12 and 13 and supply a mass flow according to this proper ratio through supply hoses 28 and 29 to a mixing and dispensing head 30.

The supply hoses 28 and 29 from the metering pumps 24 to the mixing and dispensing head 30 are preferably jacketed to control the temperature of the components in the supply hose by circulating a liquid in the outer jacket. A temperature conditioning unit 33 supplies cooling or heating liquid, such as water, to the outer jacket of the supply hoses 28 and 29. The control console 11 may also be connected to the temperature conditioning unit 33 by suitable control lines (not shown). A gas injection system 36 may be used to inject a precise amount of gas into the polyol supply hose 28 downstream of the metering pump 24.

At the mixing and dispensing head 30, the two components are mixed according to the accurate ratios of each component supplied to the dispensing head by the metering pumps 24, and dispensed onto a substrate 39. The mixing and dispensing head 30 is also connected to a purge system comprising a solvent supply 40 and an air supply 41. The purge system is used to purge or clean the head 30 as needed. The solvent may be any suitable solvent. A preferred solvent can be a soap solution as it is relatively benign and does not present any safety hazards. The actual solvent used will depend upon the materials in the system.

Figure 2:
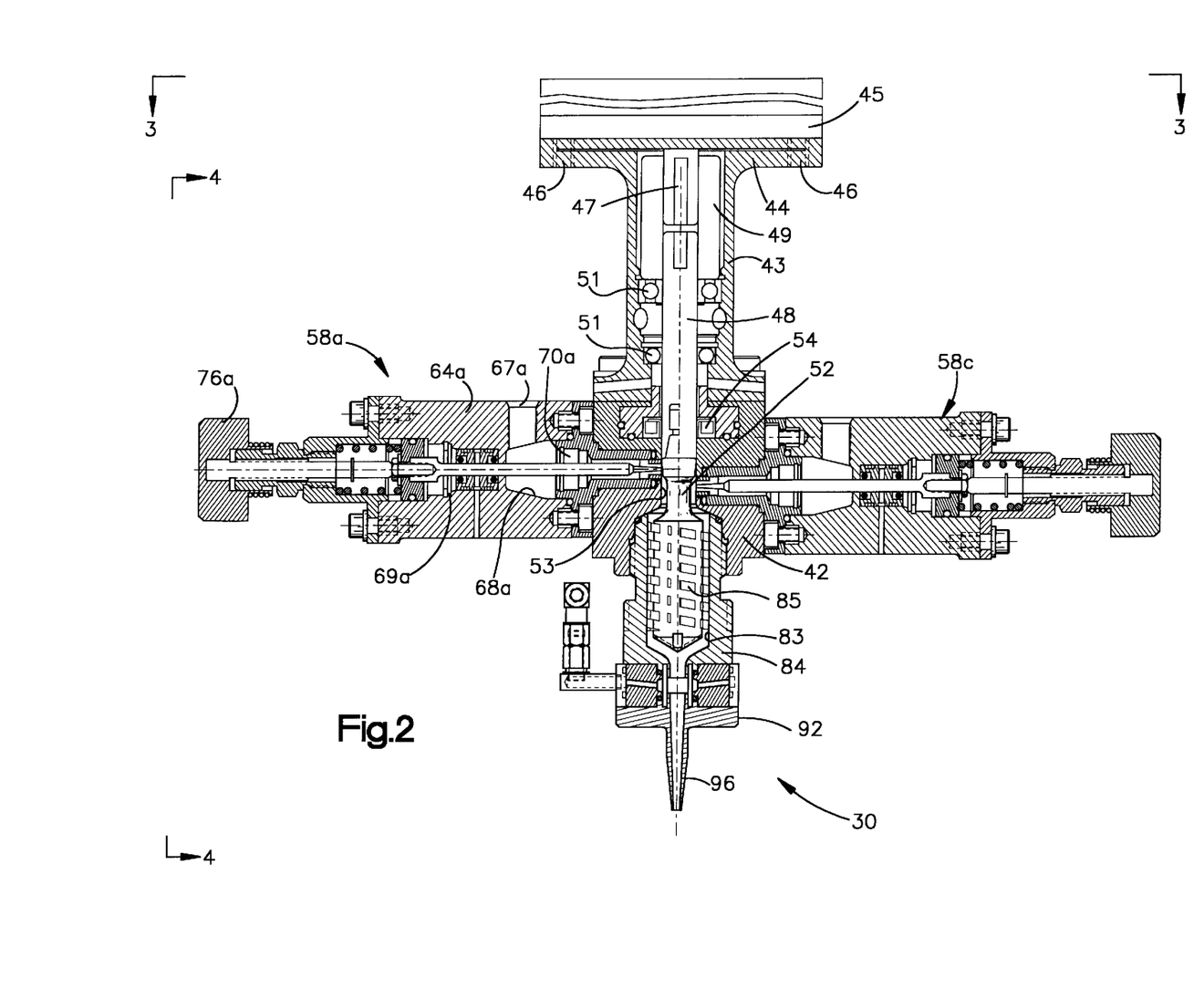
FIG. 2 is a side sectional view of the mixing and dispensing head of the present invention.

The mixing and dispensing head 30 is shown in more detail in FIG. 2. The head 30 comprises a main body 42 with a bearing housing 43 attached to the upper end. A platform 44 is formed on the upper end of the bearing housing 43, and an electric servo motor 45 is mounted on the platform 44 by means of screws 46. A rotatable motor shaft 47 extends downwardly from the motor 45 through an opening in the platform 44 into the bearing housing 43. The motor shaft 47 is connected to a drive shaft 48 by means of a coupling 49. The drive shaft 48 extends vertically through a central opening in the bearing housing 43, where it is journalled in bearings 51, and extends into a coaxial central opening in the main body 42. A mixing shaft 52 is mounted on the lower end of the drive shaft 48. The mixing shaft 52 rotates within a mixing chamber 53 formed at the lower end of the central opening in the main body 42. A suitable sealing device 54 is provided around the lower end of the drive shaft to seal upper end of the mixing chamber 53. The preferred sealing device is a Model No. S67350-2588 sealing ring, sold under the name Varilip, available from the American Variseal division of CBB Seal Co., Warrensville Heights, Ohio.

Figure 3:
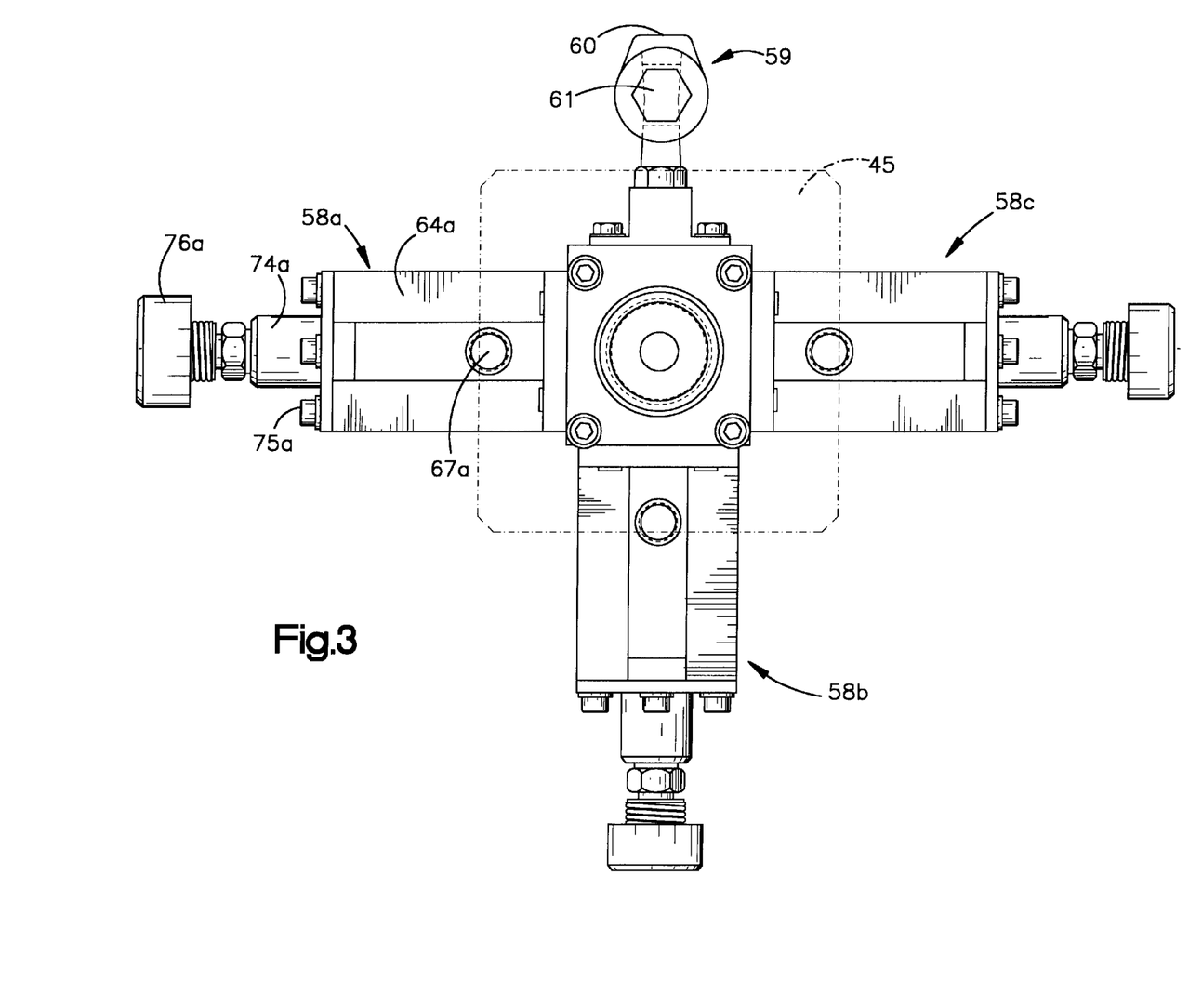
FIG. 3 is a top plan of the mixing and dispensing head taken along line 3—3 of FIG. 2.
Figure 4:
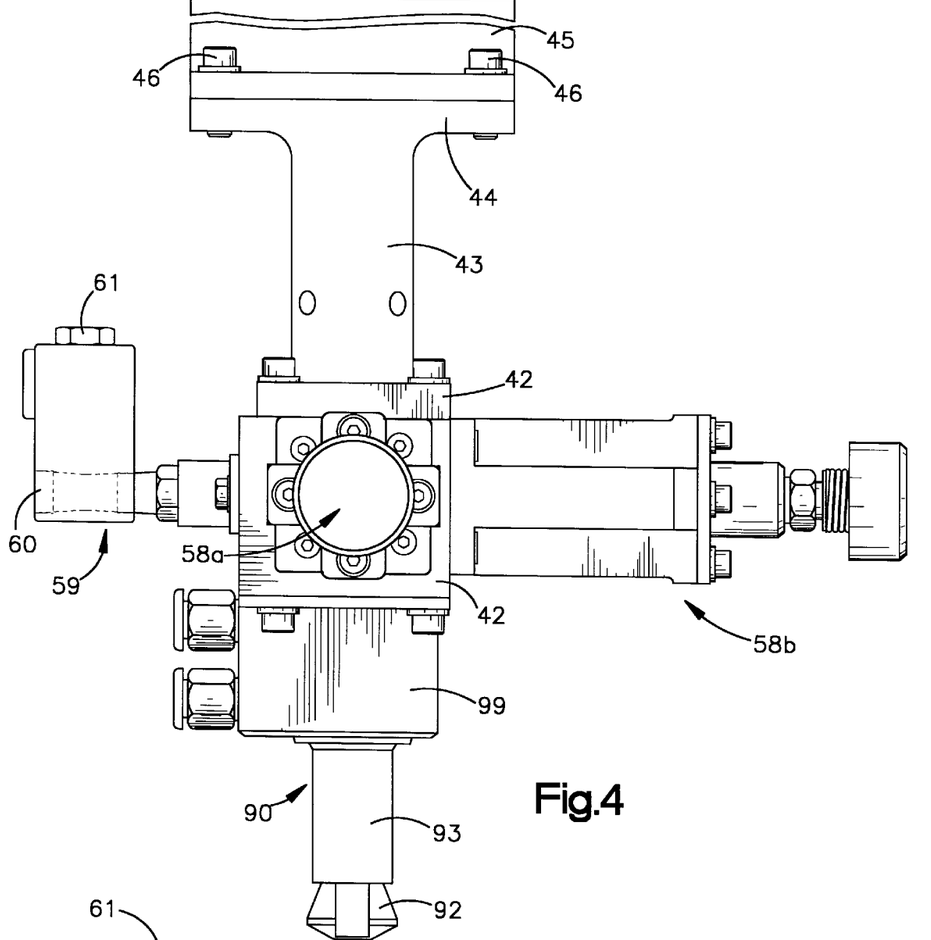
FIG. 4 is a side elevational view of the mixing and dispensing head taken along line 4—4 of FIG. 2.
Figure 5:
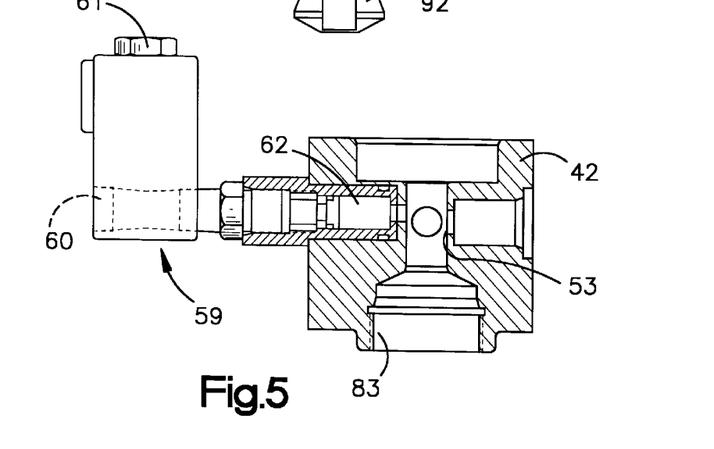
FIG. 5 is a side sectional view of the purge valve system of the mixing and dispensing head taken from the same elevation as FIG. 4.

Extending horizontally outwardly from the main body 42 are a plurality of supply valve assemblies 58a, 58b and 58c (FIG. 3). In the preferred embodiment shown, there are three supply valve assemblies 58a, 58b and 58c, two supply valve assemblies 58a and 58b for the polyol, and one supply valve assembly 58c for the isocyanate. Two supply valve assemblies are provided for the polyol, to allow the user to connect the mixing and dispensing head to two different supplies of polyol, such as to change the color of the dispensed material. However, it should be understood that only one polyol supply valve assembly is necessary. The supply valve assemblies extend horizontally in a direction generally perpendicularly to each other. In other words, the supply valve assembly 58a is perpendicular to the supply valve assembly 58b, and the supply valve assembly 58b is perpendicular to the supply valve assembly 58c. The supply valve assembly 58a is thus opposite the supply valve assembly 58c. A purge valve assembly 59 (FIG. 4) is opposite the other supply valve assembly 58b. As shown in FIG. 5, the purge valve assembly 59 includes a port 60 which provides an inlet for connection to the solvent supply 40 and a port 61 which provides an inlet for connection to the air supply 41, both as previously described. The purge valve assembly 59 allows the purge solvent and high pressure air to be introduced into the mixing chamber 53 to clean the chamber of component residue as needed. The purge valve assembly 59 also includes a check valve 62 to prevent components from flowing back to the solvent and air supplies 40 and 41.

Figure 6:
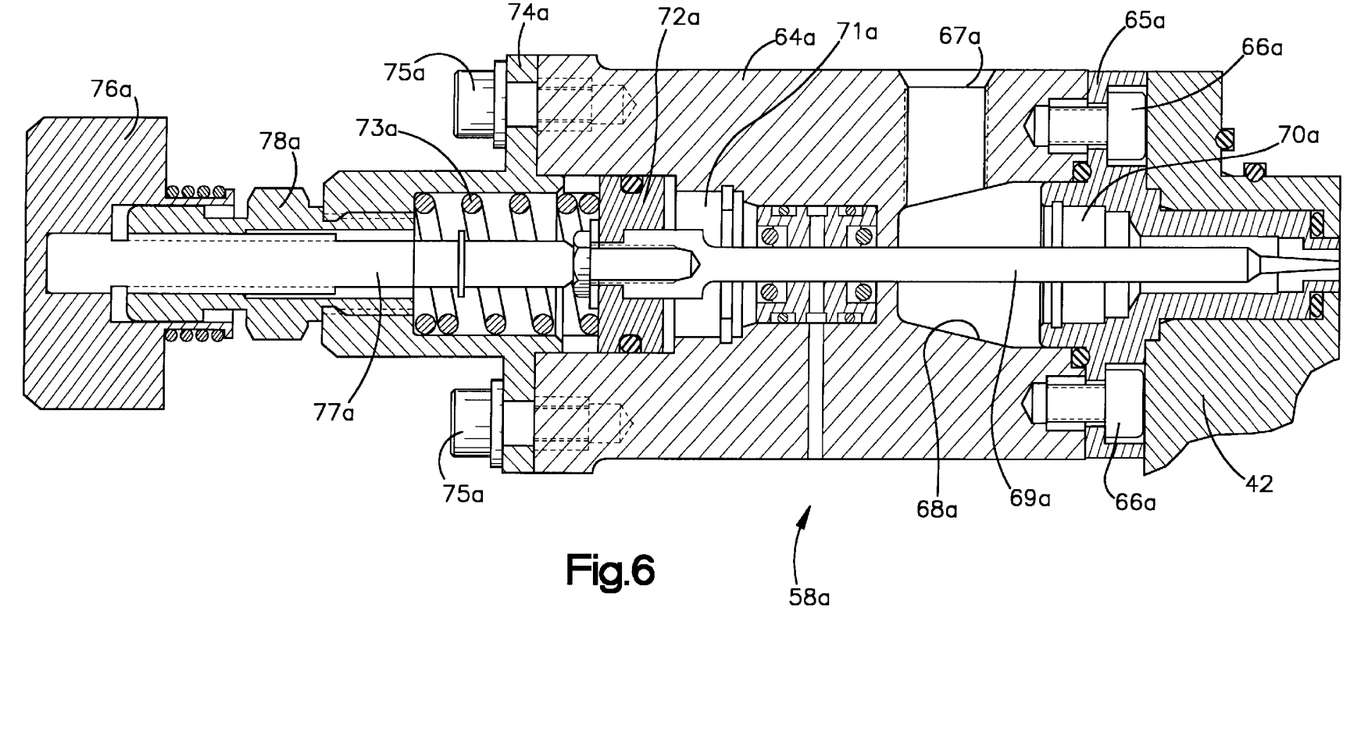
FIG. 6 is a detailed sectional view of one of the supply valve assemblies of the mixing and dispensing head, which is a portion of the side sectional view of FIG. 2 to a larger scale.

All of the supply valve assemblies 58a, 58b and 58c are essentially the same, and all can be described with reference to the supply valve assembly 58a shown in more detail in FIG. 6.

The supply valve assembly 58a is pneumatically operated "zero cavity" valve, comprising a body assembly formed of a main body portion 64a and a secondary body portion 65a which is attached to the main body portion 64a by means of suitable fasteners such as screws 66a. The body assembly comprising the portions 64a and 65a is mounted onto the side of the main body 42 by another set of screws (not shown) arranged at 45° with respect to the screws 66a. A port 67a is provided on one side of the body 64a. The port 67a has internal threads for insertion of a suitable connection to a supply hose, such as one of the supply hoses 28 and 29 shown in FIG. 1. The component material from the supply hose enters the body 64a through the port and enters into a supply chamber 68a formed within the body 64a. The supply chamber 68a is connected to the mixing chamber 53 within the main body 42, and a valve seat is provided between the supply chamber 68a and the mixing chamber 53. A needle valve member 69a is guided by a guide member 70a mounted in the downstream portion of the chamber 68a. The needle valve member 69a extends through the chamber 68a and engages the valve seat to control the flow of component material from the supply chamber 68a into the mixing chamber 53. With "zero cavity" valve design, the valve head formed by the needle valve member 69a is at the maximum position downstream so that there is no cavity of residual material downstream in the supply chamber prior to entering the mixing chamber. When the needle valve member 69a is retracted away from the valve seat, the flow of component material from the supply chamber 68a into the mixing chamber 53 is enabled. When the needle valve member 69a rests on the valve seat, the flow of component material from the supply chamber 68a into the mixing chamber 53 is cut off. The needle valve member 69a is actuated through a pneumatic chamber 71a formed within the body 64a. Air in the pneumatic chamber 71a operates against a piston 72a connected to the end of the needle valve member 69a to open the valve. The valve is urged into the closed position by a spring 73a which pushes against the piston 72a on the opposite side from the pneumatic chamber 71a. The spring 73a is retained within a cap 74a attached to the end of the body 64a by suitable fasteners such as bolts 75a. The maximum open position of the valve is adjusted by means of an adjusting knob 76a which is mounted on the end of an adjusting rod 77a. A nut member 78a is mounted on the end of the cap 74a, and makes a threaded connection with the adjusting rod 77a. The axial position of the adjusting rod 77a is changed by turning the knob 76a to move the adjusting rod relative to the nut member 78a.

Referring again to FIG. 2, the upper portion of the mixing shaft 52 comprises a portion which rotates in the upper portion of the mixing chamber 53 and which is contacted by the component material exiting from the supply valve assembly 58a. It will be noted that the supply valve assembly 58a is vertically offset from the supply valve assembly 58c, so that the components enter the mixing chamber 53 at different vertical levels. In the preferred embodiment, the level of the supply valve assemblies 58a and 58b is vertically above the level of the supply valve assembly 58c, so that the polyol is introduced into the mixing chamber 53 upstream of the isocyanate. This arrangement should be contrasted with impingement mixers of the prior art in which the components enter the mixing chamber opposite each other and mixing is accomplished by shooting the components at each other in the mixing chamber.

One reason why the exit of the supply valve assembly 58a is located above the exit of the supply valve assembly 58c is because polyol has better lubricating qualities than isocyanate and has less tendency to attack the seals, so it is preferred that polyol be introduced into the mixing chamber upsteam of isocyanate.

Below the mixing chamber 53 is an enlarged mixing chamber 83 formed within a tubular extension 84 mounted on the lower portion of the main body 42. Within the extension 84 is a cylindrical mixing core 85 having an array of indentations and outwardly extending angled vanes 86. The mixing core 85 is mounted to the lower end of the mixing shaft 52, and the core rotates within the enlarged mixing chamber 83 as the mixing shaft turns. As the cylindrical mixing core 85 rotates, the vanes 86 create turbulence which mixes the components supplied from the supply valve assemblies 58 until the components are thoroughly mixed together to create the chemical reaction which produces the foam which is then ready to be dispensed from the mixing and dispensing head 30.

Figures 7, 7A:
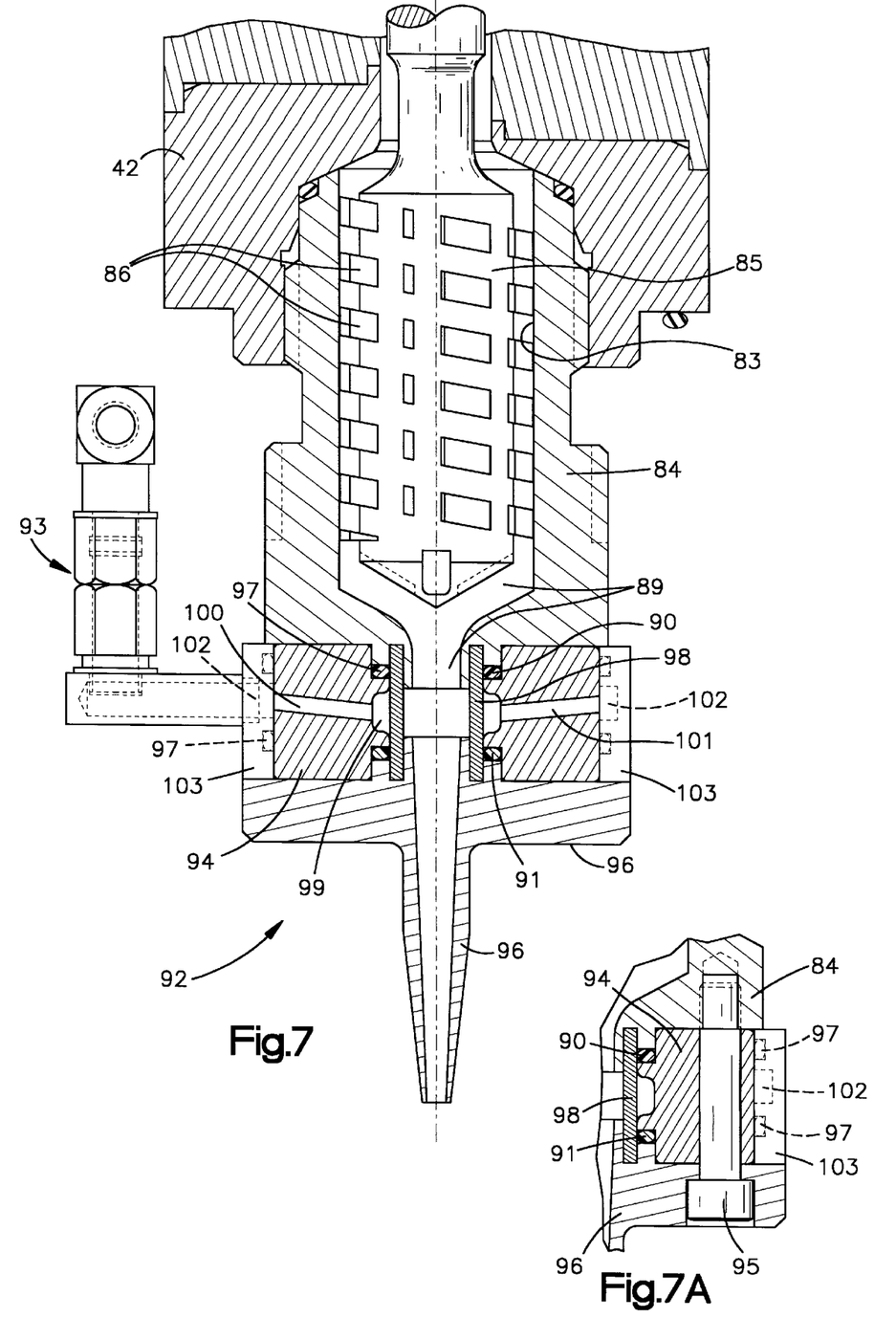
FIG. 7 is detailed sectional view of the flow shutoff assembly of the mixing and dispensing head shown with the dispensing channel open, which view is a portion of the side sectional view of FIG. 2 to a larger scale.
FIG. 7A is a portion of the sectional view of the flow shutoff assembly similar to FIG. 7 taken along a radius which is angularly offset from the section of FIG. 7 to show the connection of the nozzle member and the housing to the rest of the mixing and dispensing head.
Figure 8:
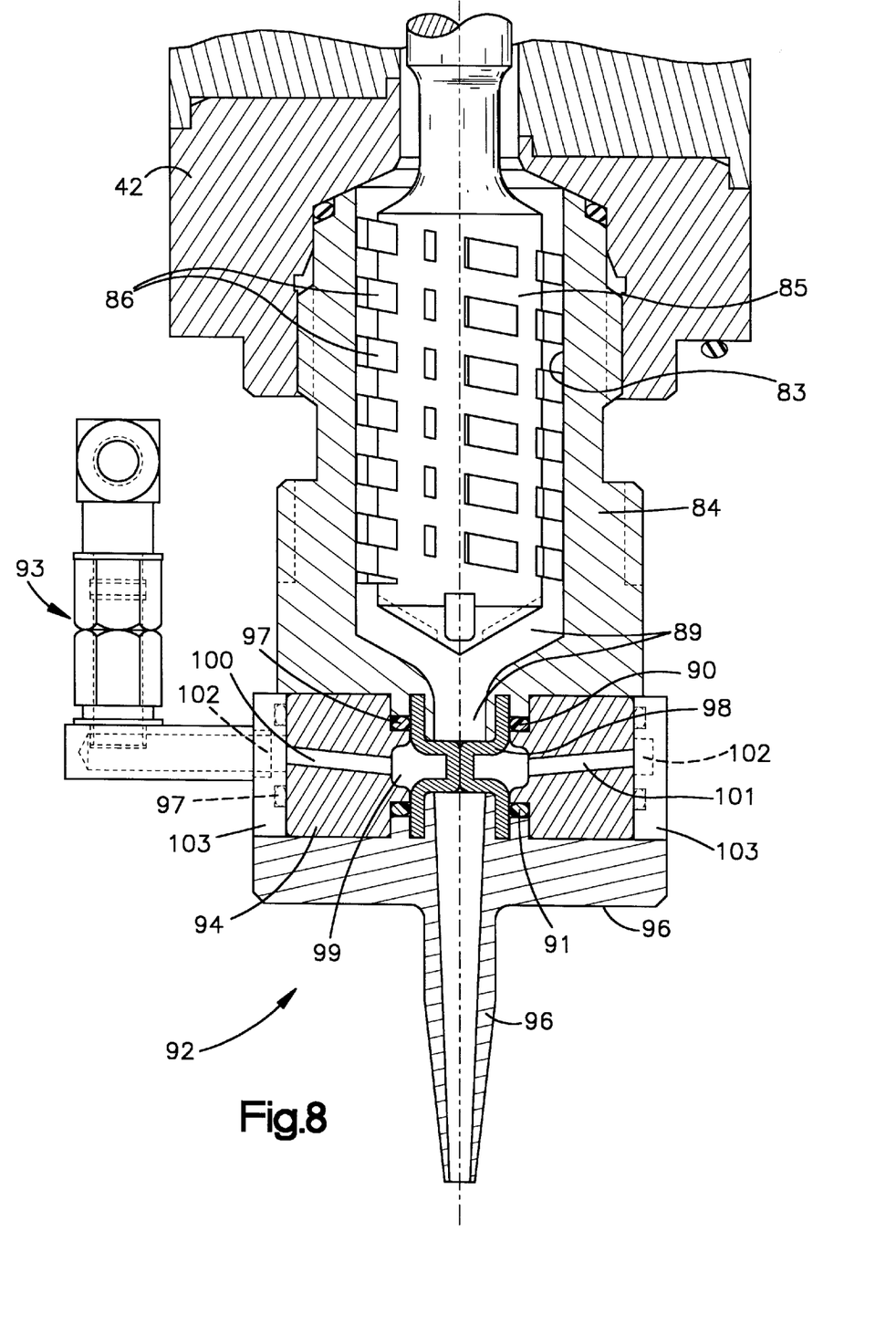
FIG. 8 is another sectional view of the flow shutoff assembly of FIG. 7 with the assembly actuated to close the dispensing channel.
Figure 9:
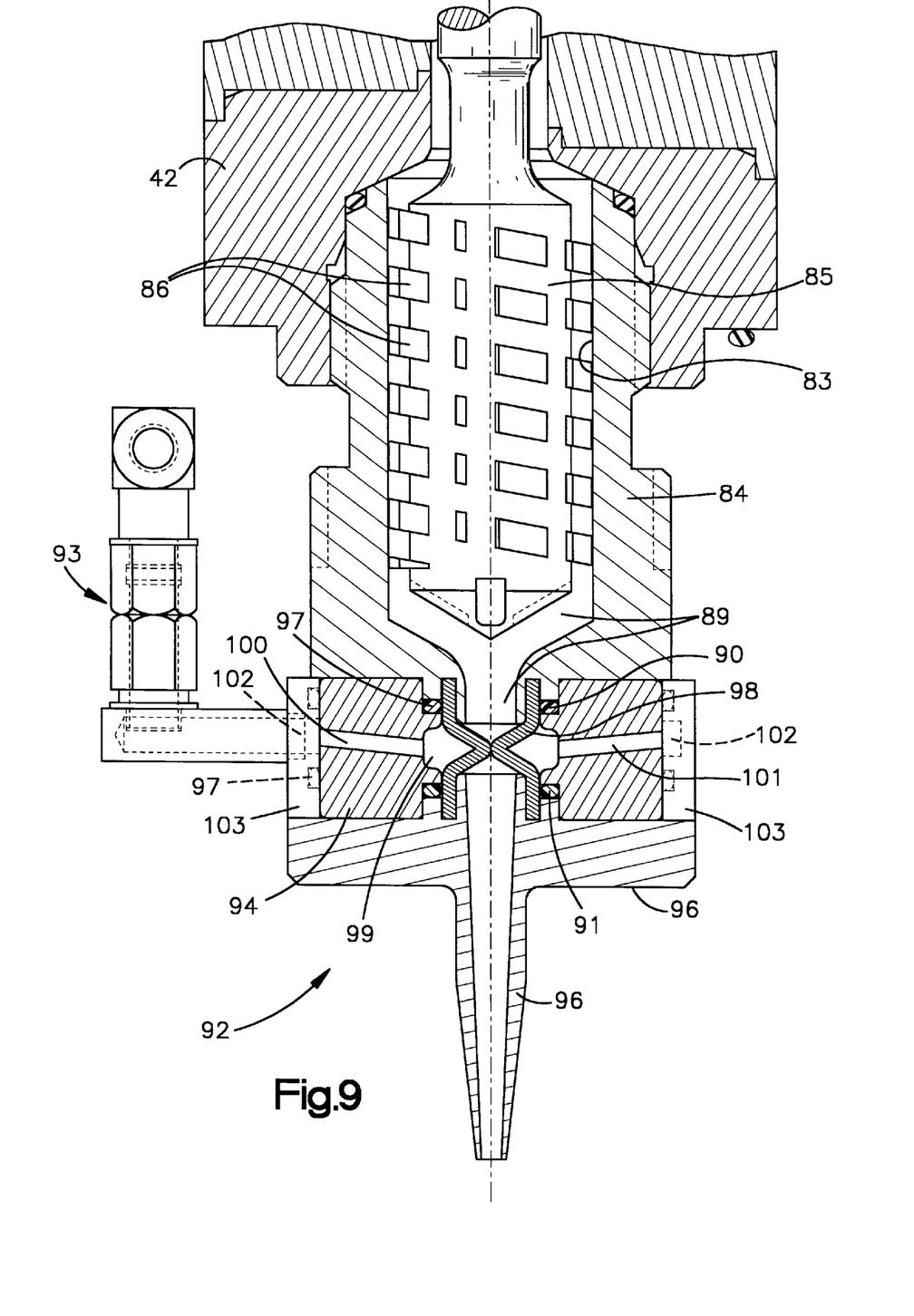
FIG. 9 is another sectional view of the flow shutoff assembly of FIGS. 7 and 8 with the assembly actuated so as to withdraw or suck the material back up the dispensing channel.

At the bottom of the extension 84, the mixing chamber 83 tapers to a dispensing channel 89, as shown in more detail in FIGS. 7, 8 and 9 After the components have been thoroughly mixed together in the mixing chamber 83, the components enter the dispensing channel 89. The dispensing channel 89 is designed as a relatively straight channel without convolutions or corners which could collect undesirable accumulations of foam material which would be difficult to clean during operation of the purging system.

Below the dispensing channel is a flow shutoff assembly 92 which prevents residual portions of the mixed components from dripping or dribbling from the head when the supply valve assemblies have been closed. The flow shutoff assembly 92 comprises a housing 94 which is positioned at the bottom of the extension 84. A dispensing nozzle member 96 is mounted onto the bottom of the housing 94. The housing 94 and the nozzle member 96 are attached to the extension 84 by bolts 95 (FIG. 7A). (The bolts 95 do not appear in FIG. 7 because they are angularly offset from the sectional view of FIG. 7.) ports The housing 94 has an inner central flow channel which extends generally axially below the dispensing channel 89 and forms an extension of the dispensing channel 89. An inner flexible tube 98 is provided within the housing 94 surrounding and defining the flow channel. The upper end of the tube 98 is captured between the outside of the lower end of the extension 84 and the inside of the housing 94 and sealed with a suitable O-ring 90, while the lower end of the tube is captured between an upper end of the dispensing nozzle member 96 and the inside of the housing and sealed with a suitable O-ring 91.

An enlarged pneumatic chamber 99 is formed around the exterior of the tube 98 in the middle of the housing 94. The pneumatic chamber 99 extends along a substantial length of the tube 98. A pair of ports 100 and 101 are formed in opposite sides of the housing 94. The ports 100 and 101 communicate with the chamber 99. The ports 100 and 101 are both connected to an outer annular chamber 102 which is formed in a ring 103 which is positioned around the housing 94. The annular chamber 102 in the ring 103 is sealed to the exterior of the housing 94 by suitable O-rings 88. The ring is connected to a fitting 93 which can be connected to a suitable pneumatic line (not shown) to allow the chamber 99 to be pressurized. When the chamber 99 is pressurized, the tube 98 pinches inwardly so that it squeezes or flattens to shutoff the flow of the foam material. Although the chamber 99 is annular and extends completely around the tube 98, the arrangement of the ports 100 and 101 on opposite sides of the housing 94 causes the tube 98 to flatten in a plane perpendicular to the common axes of the ports when the chamber is pressurized Therefore, two ports 100 and 101 are preferred, although any number of ports may be used. The length of the tube 98 which is flattened depends upon the amount of air pressure applied to the chamber 99. If high pressure is applied to the chamber 99, as shown in FIG. 8, the tube 98 is flattened along the entire length of the tube that extends through the chamber. If a lesser amount of air pressure is applied to the chamber 99, as shown in FIG. 9, the tube 98 is flattened for a shorter length, although it still cuts off the flow of the foam material. The chamber 99 extends along a substantial length of the tube 98 to allow the amount of flattening of the tube to be varied by varying the air pressure in the chamber.

In use, without air pressure applied to the chamber 99, the tube 98 remains relatively straight or cylindrical, and the foam material can flow through the tube to 11 the dispensing nozzle 96 and onto the substrate, as shown in FIG. 7. When the flow of the foam material is shut off, substantial air pressure is applied to the chamber 99 through the ports 100 and 101 causing the tube 98 to squeeze or flatten along a substantial length of the tube that extends through the chamber with the tube flattening in the plane perpendicular to the common axes of the ports, as shown in FIG. 8. The air pressure applied to the chamber 99 can then be reduced slightly, so that the length of the tube which is flattened is reduced, as shown in FIG. 9. The tube 98 is resilient, so it tends to return to its normal straight or cylindrical shape when the pressure is reduced. This increases the volume within the tube 98 below the flattened portion, and causes the remaining foam material in the tube below the flattened portion to be withdrawn or sucked back up in the tube, preventing residual dribble from falling onto the substrate after shutoff.

The amount of air pressure which is applied to the tube for initial shut off and the lesser amount of air pressure applied to produce the withdrawal or sucking action in the tube will depend upon the geometry and size of the chamber 99 and the material used for the flexible tube 98. The tube 98 should be of a flexible material which has a long flex life and is able to withstand the temperature, chemical content, and abrasive nature of the materials being dispensed. To achieve the complete shutoff shown in FIG. 8, the maximum amount of air pressure that can be withstood by the system can be provided to the chamber. To achieve the withdrawal or sucking action shown in FIG. 9, the air pressure should be reduced to the level which is high enough so that the tube 98 remains closed a one point, but low enough so that tube is substantially open below the flattened portion so that the substantial increased volume below the flattened point is achieved.

Figure 10:
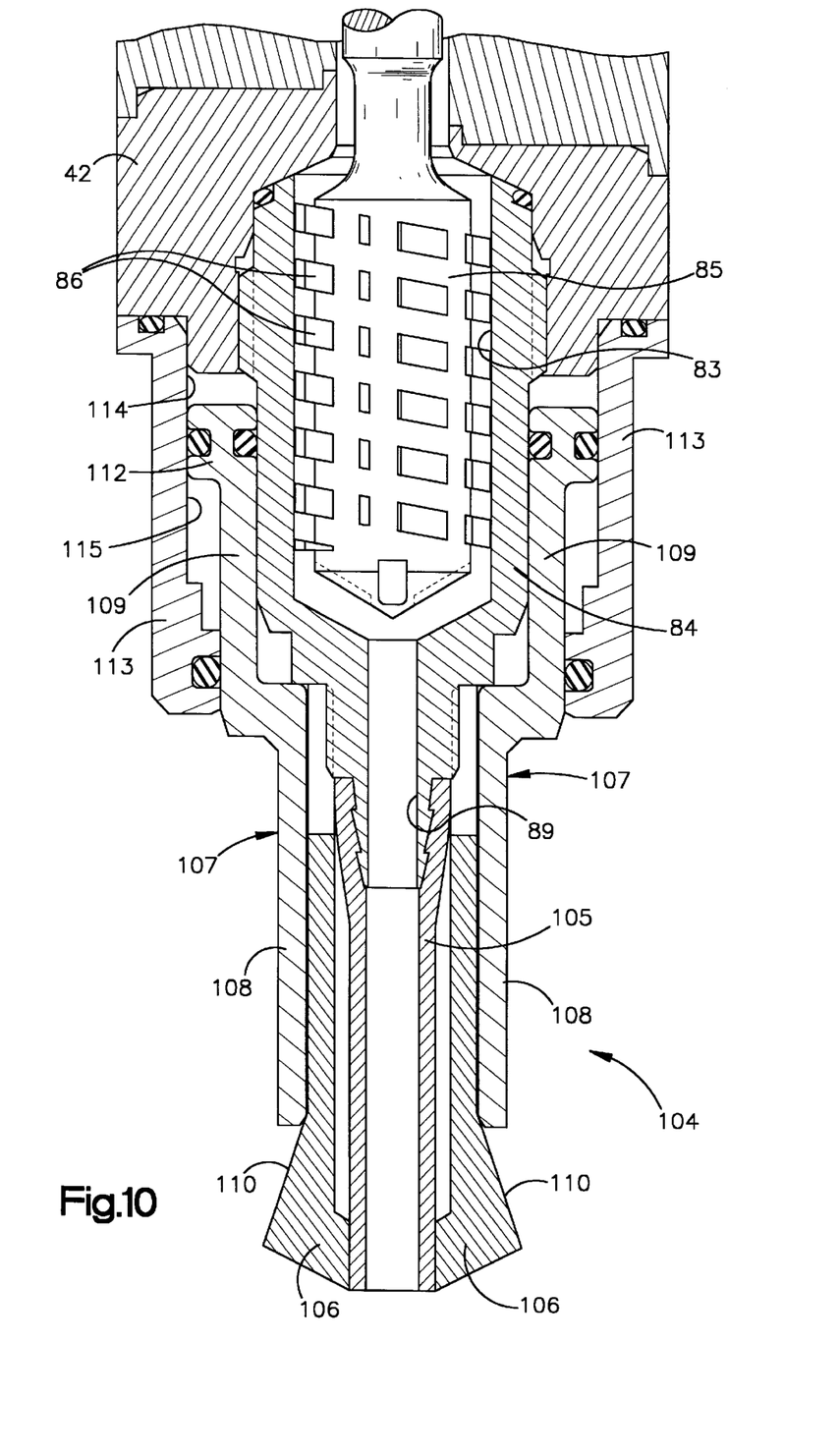
FIG. 10 is a sectional view similar to FIG. 7 of an alternative flow shutoff assembly with the dispensing channel open.
Figure 11:
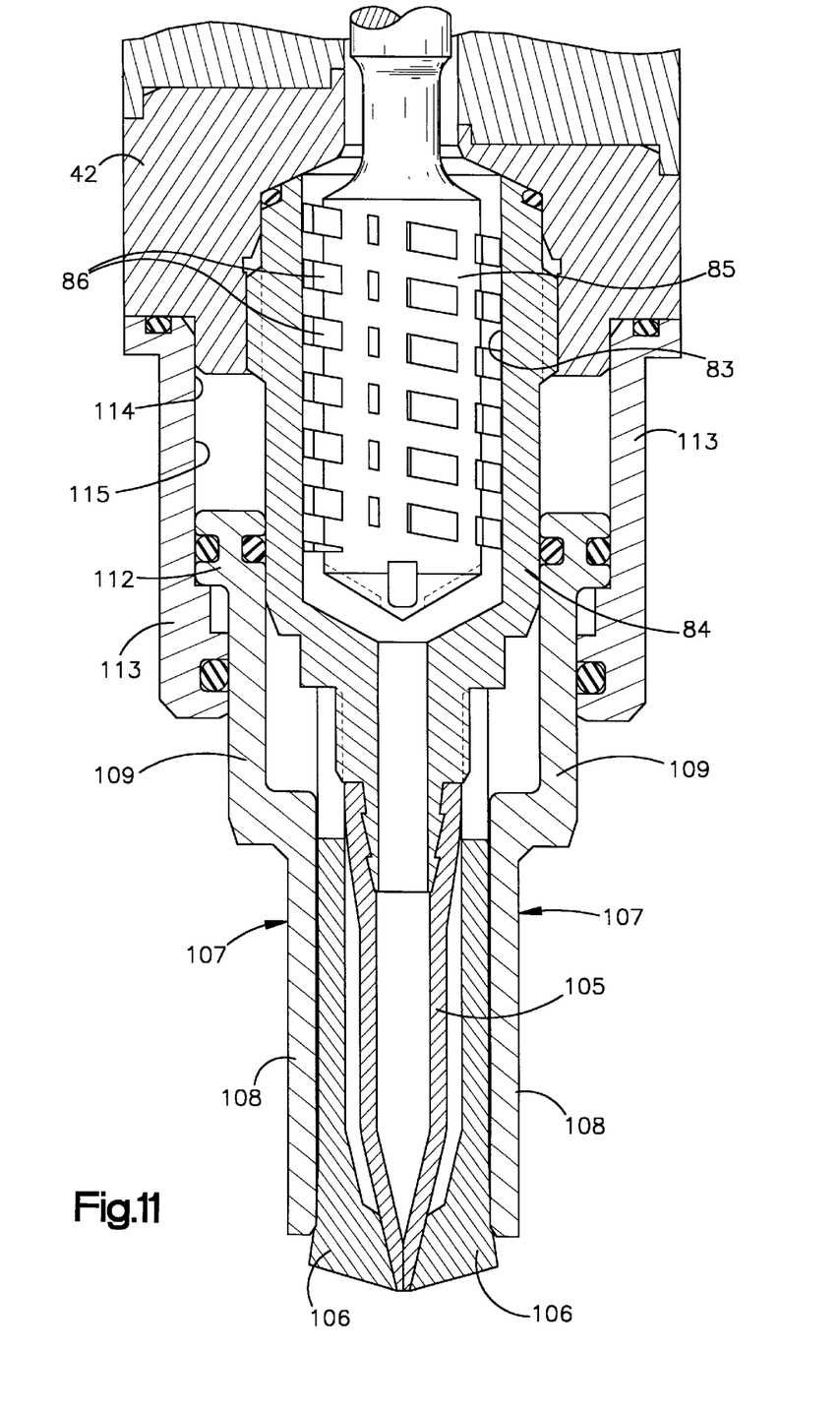
FIG. 11 is another sectional view of the flow shutoff of FIG. 11 with the assembly actuated to close the dispensing channel.

FIGS. 10 and 11 show an alternative embodiment of a flow shutoff assembly 104. The flow shutoff assembly 104 comprises a flexible tube 105 which is attached at the lower end of the dispensing channel 89, and the mixed components which are dispensed by the head enter the flexible tube 105 after exiting from the dispensing channel 89. Adjacent to the lower end of the flexible tube 105 are pincher fingers 106. Any number of pincher fingers 106 can be used, but in the preferred embodiment three fingers are employed. The pincher fingers 106 are capable of moving inwardly to compress or pinch the tube 105 to stop the flow of mixed components from the end of the tube. A piston member 107 is positioned around the pincher fingers 106. The piston member 107 has a lower portion forming a tubular actuating collet 108 and an integral upper portion forming a piston 109. The pincher fingers 106 are cammed inwardly by the vertically movable actuating collet 108 which surrounds the fingers. The lower end of the fingers 106 have camming surfaces 110 which extend radially outwardly from the flexible tube 105. As the actuating collet 108 moves downwardly, as shown in FIG. 11, it engages the camming surfaces 110 of the fingers 106 and forces the fingers 106 radially inwardly to pinch the tube 105 and cut off the flow of product from the tube. As the actuating collet 108 moves upwardly, as shown in FIG. 10, it releases the fingers 106 so that they can move radially outwardly to allow product to be dispensed from the tube 105.

The upper portion of the piston member 107, which is the piston 109, has a radially outwardly extending flange 112. The piston 109 fits around the exterior of the extension 84, and a ring 113, which is attached to the lower end of the main body 42, fits around the flange 112 and around exterior of the piston 109. The piston member 107 is moved upwardly and downwardly through the use of actuating pneumatic chambers 114 and 115. One pneumatic chamber 114 is formed between the bottom of the main body 42, the top of the flange 112, the outside of the extension 84 and the inside of the ring 113. The other pneumatic chamber 115 is formed between the inside of the lower portion of the ring 113 and the outside of the piston 109. In effect, the flange 112 forms the actuating piston which moves up and down within an annular piston chamber formed between the inside the ring 113 and the outside of the extension 84. Both chambers 114 and 115 are individually connected to a suitable pneumatic line (not shown) to allow each chamber to be individually pressurized. When the pneumatic chamber 114 is pressurized, the actuating collet 108 is pushed downwardly to cam the fingers 106 inwardly to pinch the flexible tube 105. When the pneumatic chamber 115 is pressurized, the actuating collet 108 is lifted to allow the fingers 106 to move radially outwardly to free the tube 105. Alternatively, only the chamber 114 can be connected to a pneumatic line, and a suitable spring can be placed in the other chamber 115 to return the actuating collet 108 to its upper position.

While the preferred forms of the dispensing flow shutoff assemblies 92 and 104 have been shown and described, it should be understood that other alternative designs can be employed. For example, in place of the pneumatic chambers 114 and 115 of the flow shutoff assembly 104, a pneumatically actuated diaphragm can be located near the top of the piston member to move the collet up and down. The bottom end or nose of the dispenser may also be modified so that it is narrower, allowing the dispensing head to fit into tighter spaces and dispense the foam into areas in which the other dispensing head would not fit.

Other variations and modifications of the specific embodiments herein shown and described will be apparent to those skilled in the art, all within the intended spirit and scope of the invention. While the invention has been shown and described with respect to particular embodiments thereof, these are for the purpose of illustration rather than limitation. Accordingly, the patent is not to be limited in scope and effect to the specific embodiments herein shown and described nor in any other way that is inconsistent with the extent to which the progress in the art has been advanced by the invention.

What is claimed is:

1. A dispensing head for a fluid material, which comprises:
    a dispensing channel providing a supply of fluid material to be dispensed;
    a housing connected to the dispensing channel, the housing having an inner chamber;
    a flexible tube positioned within the housing and communicating with the dispensing channel to receive a flow of the material, the tube extending through the chamber and being in one of three different positions,
    an open position allowing flow of material through the tube,
    a first closed position stopping flow of material through the tube and blocking a substantial portion of the channel, and
    a second closed position stopping flow of material through the tube and blocking a minimal portion of the channel;
    a supply of pressurized fluid at variable pressure, the variable pressure including a low pressure level, a high pressure level and an intermediate pressure level; and
    a port connecting the supply of pressurized fluid to the chamber at the variable pressure, the low pressure of fluid placing the tube in the open position allowing the flow of material through the tube, the high pressure of fluid producing substantial pinching of the tube and placing the tube in the first closed position, and the intermediate pressure producing less pinching of the tube and placing the tube in the second closed position, the changing of the tube from the second closed position to the first closed position causing withdrawal of the material in the tube in an upstream direction below the pinching.

2. A dispensing head as in claim 1, wherein the tube assumes a normal generally cylindrical shape and the tube is resilient to flex inwardly to be pinched to shutoff the flow of fluid material and to return partially to its normal shape upon reduction in the pressure of the pressurized fluid.

3. A dispensing head as in claim 1, wherein the tube has a generally cylindrical shape, the tube flexes inwardly to be pinched to shutoff the flow of fluid material, and the tube resiliently returns toward its generally cylindrical shape when the pressure of the pressurized fluid is reduced to cause the withdrawal of material.

4. A dispensing head for a fluid material, which comprises:
    a dispensing channel providing a supply of fluid material to be dispensed;
    a housing connected to the dispensing channel, the housing having an inner chamber;
    a flexible tube positioned within the housing and communicating with the dispensing channel to receive a flow of the material, the tube extending through the chamber; and
    a first port for providing a supply of pressurized fluid to the chamber at variable pressure, and
    a second port for providing a supply of pressurized fluid to the chamber at the variable pressure, the variable pressure including a low pressure of fluid allowing the flow of material through the tube, a high pressure of fluid producing substantial pinching of the tube, and an intermediate pressure producing less pinching of the tube and causing withdrawal of the material in the tube in an upstream direction below the pinching.

5. A dispensing head as in claim 4, wherein the tube is adapted to flatten in a plane perpendicular to an axis common to the ports when the chamber is pressurized.

6. A dispensing head as in claim 4, wherein the tube assumes a normal generally cylindrical shape and the tube is resilient to flex inwardly to be pinched to shutoff the flow of fluid material and to return partially to its normal shape upon reduction in the pressure of the pressurized fluid.

7. A dispensing head as in claim 4, wherein the tube has a generally cylindrical shape, the tube flexes inwardly to be pinched to shutoff the flow of fluid material, and the tube resiliently returns toward its generally cylindrical shape when the pressure of the pressurized fluid is reduced to cause the withdrawal of material.

* * * * *